(12) United States Patent
Iranpour et al.

(10) Patent No.: US 7,974,151 B2
(45) Date of Patent: Jul. 5, 2011

(54) CETACEAN PROTECTION SYSTEM

(75) Inventors: Kambiz Iranpour, Oslo (NO); Svein Arne Frivik, Oslo (NO); Espen Gulbransen, Oslo (NO); Halvor Sehested Groenaas, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 12/546,991

(22) Filed: Aug. 25, 2009

(65) Prior Publication Data
US 2010/0067326 A1 Mar. 18, 2010

Related U.S. Application Data

(60) Provisional application No. 61/097,803, filed on Sep. 17, 2008.

(51) Int. Cl.
*G01V 1/38* (2006.01)
(52) U.S. Cl. .......................................... 367/15; 367/139
(58) Field of Classification Search .................. 367/15, 367/139
See application file for complete search history.

(56) References Cited

U.S. PATENT DOCUMENTS

| | | | |
|---|---|---|---|
| 4,509,151 A * | 4/1985 | Anderson | 367/118 |
| 4,635,236 A | 1/1987 | Roberts | |
| 5,168,473 A | 12/1992 | Parra | |
| 5,351,218 A | 9/1994 | Hatteland et al. | |
| 5,377,163 A | 12/1994 | Simpson | |
| 5,563,849 A | 10/1996 | Hall et al. | |
| 6,011,753 A * | 1/2000 | Chien | 367/21 |
| 6,684,160 B1 | 1/2004 | Ozbek et al. | |
| 6,845,062 B2 | 1/2005 | Niezrecki et al. | |
| 7,012,853 B2 | 3/2006 | Iseli et al. | |
| 7,400,552 B2 | 7/2008 | Moldoveanu et al. | |
| 7,426,439 B2 | 9/2008 | Ozdemir et al. | |
| 7,466,625 B2 | 12/2008 | Robertsson et al. | |
| 2003/0151514 A1 | 8/2003 | Sargent | |
| 2006/0246654 A1 | 11/2006 | Shin | |
| 2007/0025182 A1 | 2/2007 | Robertsson | |
| 2007/0223307 A1 | 9/2007 | Storteig et al. | |
| 2008/0008037 A1 | 1/2008 | Welker | |
| 2008/0144442 A1 | 6/2008 | Combee et al. | |
| 2008/0186804 A1 | 8/2008 | Amundsen et al. | |
| 2008/0267010 A1 | 10/2008 | Moldoveau et al. | |
| 2009/0003132 A1 | 1/2009 | Vassallo et al. | |
| 2009/0141587 A1 | 6/2009 | Welker et al. | |
| 2009/0251991 A1 | 10/2009 | Ayela | |

OTHER PUBLICATIONS

Kosiara et al., "Shell moves to protect marine mammals offshore Alaska", Offshore, Sep. 1, 2008.*
Breitzke et al., "Broadband Calibration of Marine Seismic Sources used by R/V Polarstern for academic research in Polar Regions", Geophys. J. Int (2008) 174, pp. 505-524.*
Guidelines for Minimising Acoustic Disturbance to Marine Mammals from Seismic Surveys, Joint Nature COnservation committee, Apr. 2004.*
Potter et al., "Visual and Passive Acoustic Marine Mammal Observationsand High Frequency Seismic SOurce Characteristics . . . ", IEEE Journal of Oceanic Engineering, vol. 32, No. 2, Apr. 2007.*
http://www.pamguard.org/home.shtml, Feb. 22, 2007.
PCT Search Report, dated Apr. 12, 2010, Application No. PCT/US2009/054987.

* cited by examiner

*Primary Examiner* — Ian J Lobo

(57) ABSTRACT

An embodiment according to one or more aspects of the present disclosure for conducting a marine survey includes towing a survey spread comprising a plurality of receivers and an energy source along a selected course; emitting a signal from an energy source; receiving data from the plurality of receivers; detecting a cetacean from the received data; positioning the detected cetacean; limiting contact with the detected cetacean; and conducting a marine survey.

23 Claims, 1 Drawing Sheet

CETACEAN PROTECTION SYSTEM

RELATED APPLICATION

This application claims the benefit of U.S. Provisional Patent Application No. 61/097,803, filed Sep. 17, 2008.

TECHNICAL FIELD

The present invention relates in general to detecting and determining the position of marine mammals and more specifically to protecting marine mammals from man-made energy sources (e.g., acoustic disturbances).

BACKGROUND

In an ever increasing frequency man and marine mammals are crossing paths. It is therefore a desire to mitigate any harmful exposure of the marine mammals to man's activities. One source of concern for marine mammals is marine survey operations. Heretofore, various systems have been proposed and utilized to identify and position marine mammals. However, these systems are often undesirable in construction, logistical requirements in addition to providing only the most rudimentary functionality.

There is a continuing desire to provide and display real-time information to mitigate the harm or perceived harm to marine mammals from marine survey operations. There is a desire to identify safety or prevention zones for the marine mammals. There is also a desire to provide efficient survey operations while limiting contact with marine mammals.

SUMMARY

An embodiment according to one or more aspects of the present disclosure of a monitoring system for marine mammal detection integrated into a marine survey system includes an array of receivers; an energy source emitting a signal for conducting marine surveys; and a processing unit adapted to receive data from the array of receivers to detect a cetacean vocalization.

An embodiment according to one or more aspects of the present disclosure of a method for limiting contact with marine mammals during marine survey operations comprises conducting a seismic survey; identifying a prevention zone relative to the seismic survey; detecting the presence of a cetacean; and limiting contact with the prevention zone.

An embodiment according to one or more aspects of the present disclosure for conducting a marine survey includes towing a survey spread comprising a plurality of receivers and an energy source long a selected course; emitting a signal from an energy source; receiving data from the plurality of receivers; detecting a cetacean from the received data; positioning the detected cetacean; limiting contact with the detected cetacean; and conducting a marine survey.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
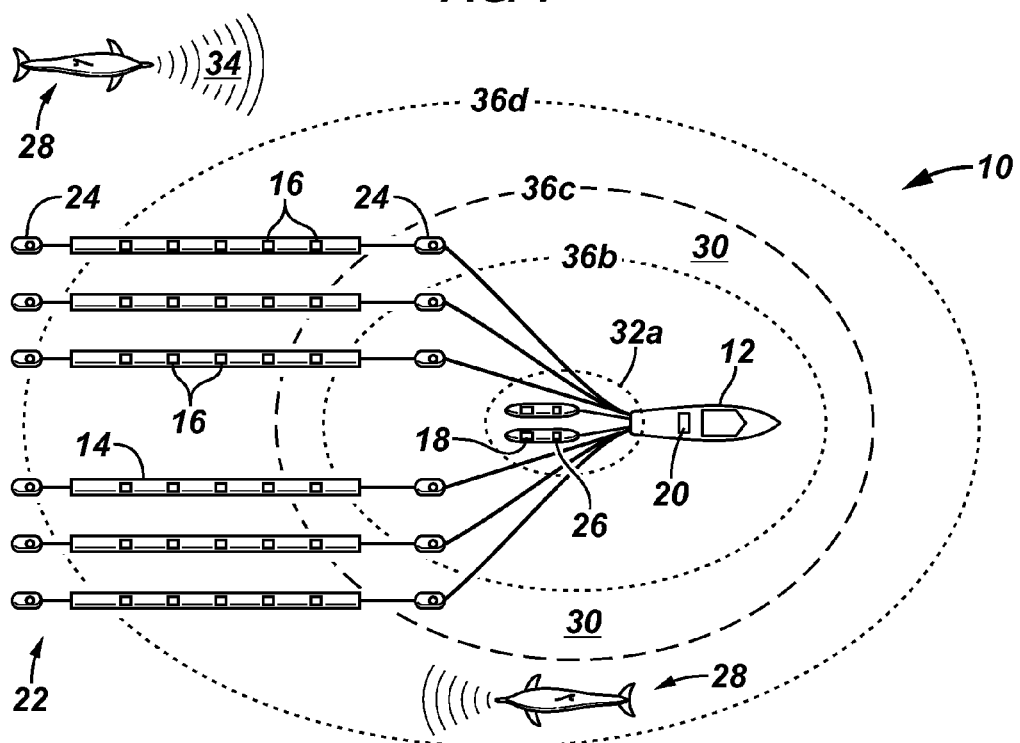
FIG. 1 is a plan view of an embodiment of a cetacean protection system of the present integrated in a marine survey system.

Refer now to the drawings wherein depicted elements are not necessarily shown to scale and wherein like or similar elements are designated by the same reference numeral through the several views.

Reference is made to a towed marine seismic survey, where one or several streamers are towed behind a vessel with one or more sources towed behind the same and/or another vessel. The seismic streamers may be several thousand meters long and contain a large number of sensors, which are distributed along the length of the each seismic streamer cable. Reference may be made to the in-line direction as the direction in the horizontal plane parallel to the streamer(s). A Cartesian coordinate system will also be used where the in-line direction is referred to as the x-direction. Conversely, the cross-line direction may be referred to as the direction in the horizontal plane perpendicular to the streamer(s). In the Cartesian coordinate system, the cross-line direction is referred to as the y-direction.

The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits. Similarly, electromagnetic (EM) surveying can use EM sources and receivers. One type of EM surveying is referred to as controlled source EM surveying (CSEM), in which an EM transmitter is used to generate EM signals that are propagated into the subterranean structure. Subterranean elements reflect the EM signals, with the reflected EM signals received by the EM receivers.

For the case of multi-component seismic sensors, each sensor may be capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components of a particle velocity and one or more components of a particle acceleration. An example of a commercial multi-component system designed for ocean-bottom (also known as seabed) applications is WesternGeco's Q-SEABED system.

Depending on the particular embodiment, the multi-component seismic sensor may include one or more hydrophones, geophones, particle displacement sensors, particle velocity sensors, accelerometers, pressure gradient sensors, or combinations thereof. For example, in accordance with some embodiments, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

FIG. 1 is a schematic, plan view of an embodiment of a cetacean protection system generally denoted by the numeral 10. In the illustrated and described embodiment, system 10 is passive cetacean monitoring system integrated with a marine survey system (e.g., electromagnetic surveying, seismic surveying). Some examples of marine survey systems that may be utilized in whole or in-part for cetacean detection are disclosed in: U.S. patent application Ser. No. 12/132,592; U.S. Pat. Nos. 7,466,625; 7,426,439; 7,400,552; 6,684,160 and 5,351,218; and U.S. Patent Application Publication Nos. 2009/0141587; 2009/0003132; 2008/0267010; 2008/0186804; 2008/0144442; 2008/0008037; 2007/0025182 and 2006/0246654; all of which are incorporated herein by reference. One type of EM surveying is referred to as controlled source EM surveying (CSEM), in which an EM transmitter (e.g., source) is used to generate EM signals, with the reflected EM signals received by the EM receivers.

In some embodiments system 10 may position (e.g., locate) the detected cetacean for example, and without limitation, by beam-forming. System 10 may utilize vector sensors for detecting and/or position the cetaceans. Positioning may comprise determining a location relative to a prevention zone, determining a distance (e.g., range) to the detected cetacean and/or determining a direction to the detected cetacean from a selected location. In some embodiments, system 10 can detect, classify, position, and track marine mammals relative to the marine survey system. System 10 may provide data as to the survey (e.g., energy) source level that the marine mammal may have been, or will be, exposed from the encounter with the survey operations. Marine mammals are defined generally herein as cetaceans and include without limitation whales, porpoises, dolphins, sea otters, sea lions, seals, and walruses.

System 10 comprises a survey system including a vessel 12, a towed streamer 14, a survey source 18, and a processing unit 20. Vessel 12 commonly tows a plurality of streamers 14 laterally space from one another to form a spread 22 for conducting the marine survey. Each streamer 14 commonly includes a plurality of receivers 16, which may include without limitation vector wavefield sensors. Examples of receivers 16 include without limitation, accelerometers, hydrophones, geophones, electromagnetic receivers, particle motion sensors, pressure gradient sensors and combinations thereof. Receivers 16 may be single sensor receivers. In some embodiments, one or more of receivers 16 may be grouped formed. Examples of some group formed, and multi-component streamers, are disclosed in U.S. Pat. Nos. 6,684,160 and 5,351,218 and in U.S. Patent Application Publication No. 2009/0003132, which are incorporated herein by reference.

Each streamer 14 may also include a global positioning (GPS) unit 24. GPS unit 24 may be carried by a buoy and may be combined with various elements and systems such as and without limitation a guidance system and transceiver. Although not illustrated specifically in FIG. 1, it is understood that survey spread 22 may include a ranging and positioning system that may include pingers and dedicated ranging receivers.

In the depicted embodiment, system 10 includes a survey source 18 (e.g., source array) towed by vessel 12. Survey source 18 may include various types of energy sources including without limitation airguns and electromagnetic sources. In the depicted system, source 18 includes one or more source receivers 26 which may include, without limitation, vector wavefield sensors, hydrophones, geophones, accelerometers, positioning hydrophones, near field hydrophones (NFH), particle motion sensors, pressure gradient sensors, electromagnetic sensors and combinations thereof. Source 18 and source receivers 26 may be positioned on a streamer that is separate from the survey streamer. In some embodiments, one or more receivers 16, 26 may, for example, be positioned on a streamer that is towed behind the source streamer and ahead of the survey streamer. It is also recognized that the survey streamer and the source streamer may be towed behind separate vessels.

According to one or more aspects of the present disclosure, system 10 may detect and position cetaceans 28 such that remedial actions may be taken to limit and/or preclude exposure of the cetacean to a prevention zone, generally denoted by the numeral 30. According to one or more aspects of the present disclosure, system 10 may determine (e.g., define) prevention zone 30, provide remedial actions to maintain a defined prevention zone, and/or implement actions to maintain the prevention zone. For example, prevention zone 30 may be defined as an area relative to a portion of the survey, such as source 18 for example. Prevention zone 30 may include one or more areas, or subzones. Prevention zone 30 may be defined in terms of areas in which it is desired to exclude the cetacean and/or to an area in which exposure of the cetacean is to be limited (e.g., time of exposure). Prevention zone(s) 30 may be defined statically (e.g., a set geographic boundary) and/or dynamically (e.g., associated with operational factors, parameters, characteristics). System 10 may provide remedial steps or options for maintaining the prevention zone, for example to exclude the presence of the cetacean, limit the time of exposure, etc.). System 10 may implement actions to maintain the prevention zone. For example, according to one or more aspects of the present disclosure remedial actions may include, without limitation, altering the course of the seismic survey, ceasing seismic operations, and/or changing operational parameters such as the frequency and/or amplitude of the "shots" (e.g., sources 18).

Prevention zone 30 may be defined in various manners including, without limitation, by real and/or perceived effects of operations on cetaceans (e.g., acoustic effects, pressure effects, physical impacts), by regulation (e.g., government regulation), risk of physical damage to the cetacean and/or equipment, and/or environmental factors. For example, the United States Mineral Management Service requires what is termed as an exclusion zone of 500 meters for a water depth of 300 meters. This regulated exclusion zone is statically defined and does not take into consideration the actual operational parameters or characteristics, such as the frequency and amplitude of source 18 shots. According to one or more aspects of the present disclosure, prevention zone(s) may be defined relative to operational characteristics of the seismic survey and the criteria for precluding or limiting exposure of the cetacean. For example, according to one or more aspects of the present disclosure the acoustic level (e.g., energy level) associated with source 18 shots in a particular survey may be utilized to define the prevention zone(s). Prevention zones 30 that are associated with operational parameters may be referred to as dynamic prevention zones. In other words, by altering one or more operational parameters of the survey the scope or boundaries of the prevention zone may be dynamically altered (e.g., in real time) so that the concerns for the cetacean are addressed as well as permitting the survey to continue.

Figure 2:
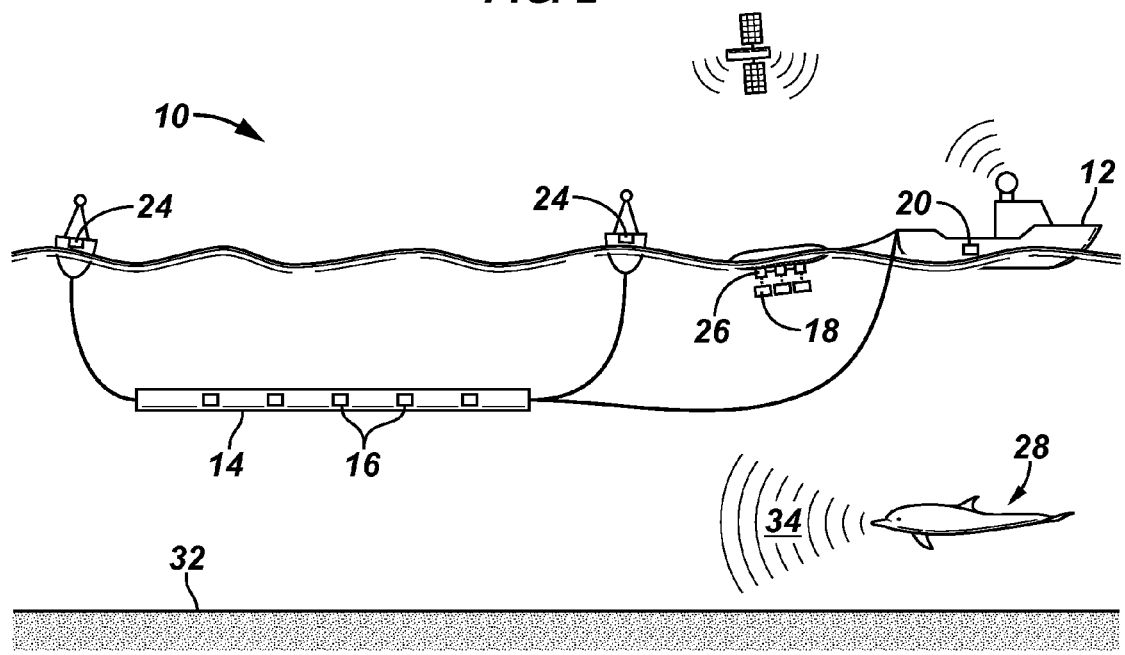
FIG. 2 is an elevation view of an embodiment of the cetacean protection system of the present invention.

Refer now to FIG. 2 wherein an elevation view of a system 10 is provided. Survey streamers 14 traditionally include streamer receiver 16 arrays and sets (e.g., arrays) of energy sources 18 (e.g., airguns, EM sources) as the survey source. The survey source 18 may emits (e.g., shoots) a signal (e.g., an acoustic impulse) with a frequency content from a few hertz to several kilohertz even though the survey band is often not more than about 128 Hz. Commonly each survey source 18 is set to provide an acoustic output sufficient to obtain deep penetration into the ocean floor 32. The signal strength may be, for example, greater than 220 dB rel 1 micro Pascal and may be seen as a threat to marine mammals in that it might disrupt their behavior and interfere with their ability to locate food and to reproduce.

Refer now to FIG. 2 wherein one embodiment of a method of protecting cetaceans 18 is described. In a first step, cetacean 28 is detected. In some embodiments, the input is being continuously recorded from single sensor receivers 16 and/or 26, wherein a cetacean 28 vocalization 34 is identified (e.g., captured). In some embodiments, input may be provided through shot based recordings, for example, recordings associated with activation of source 18. Detecting vocalization 34 includes identifying or classifying a received signal as a cetacean 28. Detecting may further include classifying the particular genus or species of cetacean 28 that is detected.

System 10 may provide locating the position of cetacean 28. In one example utilizing single sensor receivers 16 and/or receiver 26, cetacean 28 is positioned using data received from a plurality of the single sensor receivers using beamforming techniques. Positioning may include determining the position relative to a prevention zone or the like, determining a range to cetacean 28 and/or a range and direction to cetacean 28 from a selected location. Vector sensor technology may be utilized for capturing, detecting and/or positioning of cetaceans 28. Streamers 14 may be group formed.

In an example of system 10, single sensor receivers 16, 26 may be utilized for the detection, classifying and tracking of a cetacean 28. Typically streamer receivers 16 utilize a sampling frequency of approximately 500 Hz or 100 Hz for seismic acquisition operations for example. Utilizing a plurality of single sensor receivers 16, system 10 may receive inputs at a higher sampling frequency compared to common survey sampling frequencies, for example, of 1000 Hz and above, and an exemplary embodiment in the range of 1 to 100 kHz. In some embodiments of system 10, receivers 16 and/or receivers 26 may be grouped or configured in selected locations within spread 22 for the purpose of detecting and/or positioning the marine mammals. In some embodiments, a bandwidth may be assigned to a specific segment of streamers 14 (e.g., spread 22) for example to capture more high frequency data. Cetacean 28 may be detected by identifying a vocalization in the input (e.g., data recorded by receivers 16 and/or receivers 26). The vocalization may be identified in a detection sampling frequency. The detection sampling frequency may be a predetermined sampling frequency. For example, the wave field may be sampled at one or more frequencies, referred to generally herein as detection frequencies. In some embodiments the detection sampling frequency may be a higher frequency or a lower frequency than the frequency utilized for the marine survey operations, and/or the detection frequencies may be within the survey frequency range. In some examples, the input may be monitored at a detection sampling frequency to detect a cetacean 28, for example from its vocalizations.

Single sensor source receivers 26 may be utilized to detect and to track cetaceans 28. Sampling frequencies of source receivers 26 may be set for example, and without limitation, at about 1000 Hz to several hundred kilohertz. A higher sampling frequency is possible due to source receivers 26 receiving less survey data volume relative to streamer receivers 16. Additionally, source receivers 26 may be provided at different depths in the water column and therefore may provide more accurate positioning of cetacean 28 in particular in regard to depth of cetacean 28. For example, source receivers may be towed at depth levels above, below, and/or equal to source 18.

In one example a plurality of single source receivers are set at a sampling frequency of about 1 to 100 kHz. These selected receivers are continuously recording data and transmitting the data to processor 20. Continuous data recording is utilized to ensure the cetacean sound is recorded. It is understood that although processing unit 20 is illustrated on vessel 12, it may be located remote from vessel 12. Processing unit 20 may include an electronic module having a database of cetacean vocalizations. In some embodiments, comparison and analysis of the received signals with the known frequencies, characteristics, and patterns of cetacean vocalizations may be utilized to classify the received signal as a cetacean 28. It is also often desired to classify the cetacean 28. Methods for classifying cetacean 28 may include spectral analysis, frequency-time analysis, higher order spectral components, and statistical properties.

Once a cetacean 28 is detected, processing unit 20 may begin to position and/or to track cetacean 28. Various means may be utilized for positioning and tracking including, without limitation, time of arrival and beam forming techniques. It is noted that system 10 may include a plurality of single sensor receivers to utilize beam-forming techniques to localize cetacean 28. Examples of vector sensor technology are described, for example, in U.S. Pat. Nos. 7,466,625 and 7,426,439, which are incorporated herein by reference.

In some embodiments, positioning of cetacean may not be limited to locating a specific geographic position of cetacean 28 but be related to determining a range to cetacean 28, for example, the distance between source 18 and cetacean 28, or the location of cetacean relative to a prevention zone. Processing unit 20 may provide a visual display and/or an auditable signal if the tracked cetacean 28 is positioned in and/or is approaching a prevention zone 30. Processing unit 20 may provide option to minimize the disruption to the survey operations. For example, processing unit 20 may provide alternative courses for "shooting" the line or for shooting subsequent lines; alternative amplitude and/or frequencies emitted by source 18 to avoid affecting cetacean 28; and/or ceasing operations until the detected cetacean has cleared the prevention zone.

In one embodiment, source receivers 26 provide for utilization of very high sampling rates as well as continuous data recording. Therefore, a good resolution can be obtained in the desired frequency domain. For example, survey source 18 may be 15 meters long and include 2 to 4 sub arrays separated by 5 to 10 meters. Each one of the sub arrays may include several source receivers 26. Thus, a 3-dimensional array of data to determine the range and heading, as well as the depth, of cetacean 28 may be obtained.

As noted, system 10 may include multi-component and/or group formed streamers 14. In some embodiments, cetacean 28 may be detected and positioned directly from the input data without requiring sophisticated signal processing techniques, such as beam forming, for example utilizing vector sensor technology.

System 10 may predict the survey energy (e.g., sound, acoustic) level of positions around the survey operation. For example, the estimated far field signature of survey source 18 may be based on the measured response of source receivers 26. A calibrated marine source may be utilized to produce the estimated far field signature based on the measured source receivers 26 response. The calibrated marine source can calculate the source signature in all directions. A propagation model may be used to determine the sound field at any point around the selected location (e.g., source 18). Sound propagation can be determined using different methods that solve the wave equation with given boundary conditions. These methods include, without limitation, ray tracing, wave number integration techniques, normal modes, finite element methods, and other broadband modeling schemes.

Alternatively or in addition to the calculated far field signature, stored historical acquired high frequency survey source data may be utilized to predict acoustic fields (e.g., sound fields) across the survey operation. Referring to FIG. 1 several acoustic fields (e.g., sound fields, acoustic zones, prevention zones) are illustrated by the hatched lines and are identified generally as 36a, 36b, 36c, 36d, etc. As previously noted, prevention zone 30 is identified by the numeral 30 and it is also identified as a specific acoustic field 36c in this embodiment. The output from this step may be a display of contour lines of sound/acoustic pressure levels at different distances from survey source 18.

As will be further understood below, the acoustic fields may provide a more accurate determination for a prevention zone 30 than a general geometric determination. The acoustic fields provide a means of providing a real-time, or dynamic, prevention zone that may associated with the acoustic level (e.g., amplitude). For example, when conditions such as water depth and/or the survey source output signal are changed the acoustic level encountered at various distances from the source change. Thus, the protection provided by a mandated prevention zone of 500 meter, for example, may be equally provided by a 250 meter prevention zone by changing the survey operation criteria. Thus, disruptions to the survey operations and exposure of the cetacean to the survey source may be mitigated. System 10 provides a means to make decisions to maintain a geographic distance from the detected cetacean as well as the functionality to adjust operational characteristics to avoid the undesired affects on the cetacean. For example, and without limitation, system 10 may provide for determining and choosing an alternative line for shooting to avoid the cetacean and/or changing shooting characteristics such as reducing and or changing the amplitude and/or frequency emitted from source 18. In other words, by changing the survey parameters, such as the amplitude and/or frequency of the seismic source the extent of the prevention zone may be altered, for example, reduced. One method for reducing the amplitude comprises turning off one or more of the energy sources 18 during shooting. Limiting and/or avoiding contact of cetacean 28 and the prevention zone may comprise limiting the time of exposure such that the hearing loss, or equivalent, is limited or avoided.

System 10 may further include the determination and/or estimated exposure of the identified and tracked cetacean 28 to survey source 18. For example, based on acoustic fields 36 and the course of cetacean 28 and the time in which the cetacean was in each zone the exposure level of cetacean 28 may be determined. This data may be utilized for long term studies of effects on cetaceans as well as for dynamic control of the survey operations.

A monitoring system for marine mammal detection according to one or more aspects of the present disclosure may include an array of receivers; an energy source emitting a signal for conducting marine surveys; and a processing unit adapted to receive data from the array of receivers to detect a cetacean vocalization.

The processing unit may be adapted to determine a position of the detected cetacean. The position may comprise a range from a selected location and/or a direction from a selected location. The processing unit may continuously receive the data from the array of receivers. The processing unit may periodically receive the data from the receivers, for example in association with activities such as activating, e.g., shooting, the energy source. Shooting based recording and/or shot based recording, may also include long shots (e.g., greater than 20 seconds). The processing unit may detect the cetacean vocalization in a detection sampling frequency. The detecting sampling frequency may be a higher sampling frequency than a survey sampling frequency received by the array of receivers for conducting a marine survey. The detecting sampling frequency may be lower than the survey sampling frequency. In some embodiments, the ranges of the survey sampling frequency and the detecting sampling frequency may overlap.

The array of receivers may comprise single sensor receivers. The array of receivers may comprise group formed single sensor receivers. The system may comprise one or more group formed streamers. The array of receivers may include at least one selected from the group of electromagnetic sensors, hydrophones, geophones, accelerometers, pressure gradient sensors and particle motion sensors. The array of receivers may comprise a plurality of single sensor streamer receivers; and a plurality of single sensor source receivers, the source receivers positioned proximate to the energy source.

A method for detecting marine mammals according to one or more aspects of the present disclosure comprises deploying a plurality of receivers; recording data captured from the plurality of receivers; and detecting a cetacean from the recorded data.

The method may comprise positioning the detected cetacean. Positioning may include determining from a selected location at least one of a range to the detected cetacean or a direction of the detected cetacean. The detected cetacean may be positioned utilizing vector sensor technology. Positioning may comprise beam forming as well as other techniques and methods.

The plurality of receivers may include single sensor receivers. The plurality of receivers may comprise group formed receivers. The group formed receivers may comprise at least one single sensor receiver.

The method may include conducting marine survey operations. For example, the method may comprise emitting a signal from an energy source; capturing reflections of the signal at the plurality of receivers; and utilizing the captured reflections for marine survey operations. The recorded data may be continuously recorded or may be periodically recorded, for example, in association with emitting the signal from the energy source.

Detecting the cetacean may comprise identifying a vocalization of the cetacean. Identifying the vocalization may comprise monitoring a detection sampling frequency in the recorded data. The method may include emitting a signal from the energy source; capturing reflections of the signal at the plurality of receivers; and utilizing the captured reflections for marine survey operations. Utilizing the captured reflections may comprise a survey sampling frequency. The detection sampling frequency may be higher than the survey sampling frequency according to one or more aspects of the present disclosure.

A method of conducting a marine survey according to one or more aspects of the present disclosure comprises deploying a survey spread comprising a plurality of receivers; receiving data from the plurality of receivers; detecting a cetacean from the received data; positioning the cetacean; emitting a signal from an energy source; and conducting a marine survey.

The plurality of receivers may comprise a group formed streamer. The plurality of receivers may comprise single sensor receivers. The plurality of receivers may comprise at least one selected from the group of electromagnetic sensors, hydrophones, geophones, accelerometers, pressure gradient sensors and particle motion sensors.

The may further comprise tracking the movement of the detected cetacean. The method may comprise taking action limiting contact with the detected cetacean. For example, limiting contact may comprise at least one of altering a course of the deployed survey spread, altering the emitted signal's amplitude, and ceasing emitting the signal.

The method may comprise defining a prevention zone associated with the survey spread and a position of the detected cetacean. The prevention zone may be determined by legal regulation or according to other means and criteria. The method may comprise defining an acoustic field relative to the survey spread and correlating the position of the cetacean with the acoustic field. The acoustic field may be a prevention zone.

A monitoring system for marine mammal detection integrated into a marine survey system according to one or more aspects of the present disclosure includes an array of receivers having a detecting sampling frequency; an acoustic source for emitting an acoustic signal for conducting marine surveys; and a processing unit continuously receiving data in the detection sampling frequency from the array of receivers, wherein the processing unit analyzes the received data and detects a cetacean vocalization and determines a position of the cetacean.

A method for detecting marine mammals according to one or more aspects of the preset disclosure includes providing a marine survey system comprising an array of receivers and an acoustic source, the array of receivers including a plurality of detection receivers; continuously recording data from the plurality of detection receivers at a detection sampling frequency; detecting vocalizations of a cetacean from the continuously recorded data; and determining a position of the cetacean.

An integrated marine survey and passive marine mammal detection system according to one or more aspects of the present disclosure includes an array of single sensor receivers having a detecting sampling frequency and a survey sampling frequency; an acoustic source for emitting an acoustic signal for conducting a marine survey; and a processing unit continuously receiving data from the array of single sensor receivers in the detecting sampling frequency, wherein the processing unit analyzes the continuously received data and detects vocalizations of a cetacean.

A method of conducting a marine survey according to one or more aspects of the present disclosure includes deploying a survey spread comprising an array of single sensor receivers; continuously receiving data from a plurality of the single sensor receivers in a detection sampling frequency; detecting a vocalization of a cetacean from the continuously received data in the detection sampling frequency; and determining a position of the cetacean.

An embodiment according to one or more aspects of the present disclosure of a monitoring system for marine mammal detection integrated into a marine survey system includes an array of receivers; an energy source emitting a signal for conducting marine surveys; and a processing unit adapted to receive data from the array of receivers to detect a cetacean vocalization.

The array of receivers may comprise a plurality of streamer receivers; and a plurality of source receivers, the source receivers associated with the energy source. The array of receivers may comprise single sensor receivers. The array of receivers may comprise group formed single sensor receivers. The array of receivers comprise at least one selected from the group of hydrophones, geophones, accelerometers, pressure gradient sensors, particle motion sensors and electromagnetic sensors.

The processing unit continuously receives the data from the array of receivers. The data received from the array of receivers may be associated with activation (e.g., shot) of the energy source. The processing unit is adapted to determine a position of the detected cetacean relative to a prevention zone.

The processing unit may be adapted to minimize contact of the detected cetacean with the prevention zone. The prevention zone is associated with an acoustic level produced by the energy source.

An embodiment according to one or more aspects of the present disclosure of a method for limiting contact with marine mammals during marine survey operations comprises conducting a seismic survey; identifying a prevention zone relative to the seismic survey; detecting the presence of a cetacean; and limiting contact with the prevention zone.

Identifying the prevention zone may comprise estimating an acoustic level associated with the seismic survey. Estimating the acoustic level may comprise calculating the acoustic level of the seismic survey's emitted acoustic signal as a function of distance from the source of the emitted acoustic signal. Limiting contact may comprise at least one selected from the group of altering the course of the seismic survey, reducing amplitude of the seismic survey's energy source and changing a frequency of the seismic survey's energy source.

Detecting may comprise positioning the cetacean. Positioning of the cetacean may include, without limitation, locating the cetacean relative to a prevention zone, determining a range relative to a location and/or determining a direction relative to location. The method may include tracking the course of the detected cetacean.

The marine survey may comprise deploying plurality of receivers. The plurality of receivers may comprise at least one selected from the group of hydrophones, geophones, accelerometers, pressure gradient sensors, particle motion sensors and electromagnetic sensors. The plurality of receivers may comprise single sensor receivers and/or group formed single sensor receivers.

An embodiment according to one or more aspects of the present disclosure for conducting a marine survey includes towing a survey spread comprising a plurality of receivers and an energy source along a selected course; emitting a signal from an energy source; receiving data from the plurality of receivers; detecting a cetacean from the received data; positioning the detected cetacean; limiting contact with the detected cetacean; and conducting a marine survey.

Limiting the contact may include minimizing exposure of the detected cetacean to a prevention zone. A prevention zone may be associated with an acoustic level of the emitted signal. Limiting contact may comprise, without limitation, at least one selected from altering the selected course and changing the signal emitted from the energy source. Changing the signal emitted may include at least one of altering the frequency of the emitted signal and/or altering the amplitude of the emitted signal.

Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method for limiting contact with cetaceans during marine survey operations, comprising:
   conducting a seismic survey comprising towing a survey streamer having a plurality of streamer receivers along a selected course while receiving data from the plurality of streamer receivers and while selectively emitting an acoustic signal from an energy source, wherein the received data comprises a survey sampling frequency associated with the emitted acoustic signal and a detection sampling frequency;
   identifying a prevention zone;
   continuously monitoring the detection sampling frequency of the received data;
   detecting the presence of a cetacean while conducting the seismic survey in response to continuously monitoring the detection sampling frequency; and
   limiting contact between the detected cetacean and the prevention zone.

2. The method of claim 1, wherein the identifying the prevention zone comprises estimating an acoustic level associated with the conducting the seismic survey.

3. The method of claim 2, wherein the estimating the acoustic level comprises calculating an acoustic level of the emitted acoustic signal as a function of distance from the energy source.

4. The method of claim 1, wherein the limiting contact comprises at least one selected from the group of altering the selected course of the seismic survey, reducing an amplitude of the emitted signal, and changing a frequency of the emitted signal.

5. The method of claim 1, wherein detecting comprises positioning the cetacean.

6. The method of claim 1, further comprising tracking the course of the detected cetacean.

7. The method of claim 1, wherein the plurality of streamer receivers comprise at least one selected from the group of hydrophones, geophones, accelerometers, pressure gradient sensors, particle motion sensors and electromagnetic sensors.

8. The method of claim 1, wherein the plurality of streamer receivers comprise single sensor receivers.

9. The method of claim 1, wherein the plurality of streamer receivers comprise group formed single sensor receivers.

10. The method of claim 1, wherein the plurality of streamer receivers comprises a source receiver.

11. The method of claim 10, wherein the detection survey sampling frequency of the received data is obtained from the source receiver.

12. A method for conducting a marine survey, comprising:
    towing a survey spread comprising a plurality of streamer receivers and an energy source along a selected course;
    emitting a signal from the energy source to produce reflections off of geological formations;
    receiving data from the plurality of streamer receivers comprising a survey sampling frequency capturing the reflections of the emitted signal;
    selecting from the plurality of towed streamer receivers an array of streamer receivers for the purpose of detecting the presence of cetaceans;
    receiving data from the selected array of streamer receivers comprising a detection sampling frequency;
    detecting a cetacean vocalization in response to monitoring the detection sampling frequency of the received data;
    positioning the detected cetacean from the received data; and
    limiting contact with the detected cetacean if necessary in response to positioning the detected cetacean.

13. The method of claim 12, wherein limiting contact comprises at least one selected from altering the selected course and changing the signal emitted from the energy source.

14. The method of claim 13, wherein the changing the signal emitted comprises at least one of altering the frequency of the emitted signal and altering the amplitude of the emitted signal.

15. The method of claim 12, wherein the limiting the contact comprises minimizing exposure of the detected cetacean to a prevention zone.

16. The method of claim 15, wherein the prevention zone is associated with an acoustic level of the emitted signal.

17. The method of claim 16, wherein the limiting the contact comprises at least one of altering the selected course and reducing the acoustic level.

18. The method of claim 12, wherein the plurality of streamer receivers comprise at least one selected from the group of hydrophones, geophones, accelerometers, pressure gradient sensors, particle motion sensors and electromagnetic sensors.

19. The method of claim 12, wherein the plurality of streamer receivers comprises single sensor receivers.

20. The method of claim 12, wherein the plurality of streamer receivers comprises group formed single sensor receivers.

21. The method of claim 12, further comprising tracking the location of the detected cetacean while conducting the marine survey.

22. The method of claim 12, wherein the survey sampling frequency and the detection survey sampling frequency comprise different frequencies.

23. The method of claim 12, wherein the selected array of streamer receivers comprises source receivers.

* * * * *